United States Patent
Addink et al.

(10) Patent No.: US 6,892,114 B1
(45) Date of Patent: May 10, 2005

(54) MODIFYING IRRIGATION SCHEDULES OF EXISTING IRRIGATION CONTROLLERS

(75) Inventors: John Addink, Riverside, CA (US); Kirk Buhler, Corona, CA (US); Tony Givargis, Anaheim, CA (US)

(73) Assignee: Aqua Conserve, Inc., Riverside, CA (US)

( * ) Notice: Subject to any disclaimer, the term of this patent is extended or adjusted under 35 U.S.C. 154(b) by 0 days.

(21) Appl. No.: 10/343,384

(22) PCT Filed: Sep. 26, 2000

(86) PCT No.: PCT/US00/41004
§ 371 (c)(1),
(2), (4) Date: Apr. 25, 2003

(87) PCT Pub. No.: WO02/27419
PCT Pub. Date: Apr. 4, 2002

(51) Int. Cl.[7] .................................................. G05D 7/00
(52) U.S. Cl. ..................... 700/284; 700/283; 239/11; 239/63; 239/64; 239/69; 137/78.2
(58) Field of Search .............................. 137/78.2, 78.5, 137/624.11; 239/1, 11, 14.1, 63, 64, 67, 69; 340/601, 310.01; 700/282, 283, 284

(56) References Cited

U.S. PATENT DOCUMENTS

| | | | |
|---|---|---|---|
| 4,684,920 A | * 8/1987 | Reiter | 340/310.01 |
| 4,922,433 A | 5/1990 | Mark | 364/510 |
| 5,341,831 A | 8/1994 | Zur | 137/78 |
| 5,696,671 A | 12/1997 | Oliver | 364/140 |
| 5,839,660 A | * 11/1998 | Morgenstern et al. | 239/63 |
| 6,076,740 A | 6/2000 | Townsend | 239/1 |
| 2004/0011880 A1 | * 1/2004 | Addink et al. | 239/1 |

* cited by examiner

*Primary Examiner*—Leo Picard
*Assistant Examiner*—Carlos R. Ortiz
(74) *Attorney, Agent, or Firm*—Rutan & Tucker

(57) ABSTRACT

An irrigation scheduler modifies output of a preprogrammed irrigation schedule of an installed irrigation controller to at least partially improve irrigation of the corresponding landscape. Preferred embodiments accomplish this task using a microprocessor programmed to: (a) derive a first set of information from the output of an irrigation controller used to control an operation of an irrigation valve; (b) receive a second set of information comprising at least one of an environmental factor and a meteorological factor; and (c) use the first set of information and the second set of information to interfere with reception of the output by the valve.

13 Claims, 3 Drawing Sheets

MODIFYING IRRIGATION SCHEDULES OF EXISTING IRRIGATION CONTROLLERS

FIELD OF THE INVENTION

The field of the invention is irrigation controllers.

BACKGROUND OF THE INVENTION

In arid areas of the world water is becoming one of the most precious natural resources. Meeting future water needs in these arid areas may require aggressive conservation measures, irrigation systems that apply water to a landscape based upon calculated water requirements of the plants. Many irrigation controllers have been developed for automatically controlling application of water to landscapes. Known irrigation controllers range from simple devices that control watering times based upon fixed schedules, to sophisticated devices that vary watering schedules according to local geography and climatic conditions.

In the simpler types of irrigation controllers, a homeowner typically sets a watering schedule that involves specific run times and days for each of a plurality of stations, and the controller executes the same schedule regardless of the season or weather conditions. From time to time the homeowner may manually adjust the watering schedule, but such adjustments are usually made only a few times during the year, and are generally based upon the homeowner's perceptions rather than actual watering needs. One change is often made in the late Spring, when a portion of the yard becomes brown due to a lack of water. Another change is often made in the late Fall when the homeowner assumes that the vegetation does not require as much watering. These changes to the watering schedule are typically insufficient to achieve efficient watering.

More sophisticated irrigation controllers use evapotranspiration rates for determining the amount of water to be applied to a landscape. Evapotranspiration is the water lost by direct evaporation from the soil and plant and by transpiration from the plant surface. Potential evapotranspiration (ETo) can be calculated from meteorological data collected onsite, or from a similar site. One such system is discussed in U.S. Pat. No. 5,479,339 issued December, 1995, to Miller. Due to cost considerations, most of the data for ETo calculations is gathered from off-site locations that are frequently operated by government agencies. Irrigation systems that use ETo data gathered from off-site locations are discussed in U.S. Pat. No. 5,023,787 issued June, 1991, and U.S. Pat. No. 5,229,937 issued July, 1993 both to Evelyn-Veere, U.S. Pat. No. 5,208,855, issued May, 1993, to Marian, U.S. Pat. No. 5,696,671, issued December, 1997, and U.S. Pat. No. 5,870,302, issued February, 1999, both to Oliver.

Due to cost and/or complicated operating requirements, very few of these efficient ETo based irrigation controllers are presently installed at residential or small commercial landscape sites. Consequently, most residential and small commercial landscape sites are irrigated by controllers that provide inadequate schedule modification. This in turn results in either too much or too little water being applied to the landscape, which results in both inefficient use of water and unnecessary stress on the irrigated plants. Thus, a need exists for a cost-effective irrigation system for residential and small commercial landscape sites that is capable of frequently varying the irrigation schedule based upon estimates of actual water requirements. This need was satisfied to a large extent for newly installed irrigation systems by devices and methods disclosed in pending U.S. patent application Ser. No. 09/082,603. However, there are many thousands of irrigation controllers already installed that could benefit from more sophisticated irrigation techniques without requiring complete replacement.

To that end devices are already known that can be connected to existing irrigation systems to provide automatic adjustments to the irrigation schedule. Unfortunately, most such devices merely interrupt complete irrigation schedules based upon a single simplistic parameter such as detection of rain or excessive soil moisture. Examples of rain sensors are found in U.S. Pat. No. 4,613,764, issued September, 1986 to Lobato, U.S. Pat. No. 5,312,578, issued June, 1994 to Morrison et. al., U.S. Pat. No. 5,355,122 issued October, 1994 to Erickson, and U.S. Pat. No. 5,101,083, issued March, 1992 to Tyler, et al. Irrigation interrupters are also known that utilize other factors, including temperature extremes, high light intensity, high winds, and high humidity. See e.g., U.S. Pat. No. 5,839,660, issued November, 1998 to Morgenstern, et al., U.S. Pat. No. 5,853,122, issued December, 1998 to Caprio, U.S. Pat. No. 4,333,490 issued June, 1982 to Enter, SR., and U.S. Pat. No. 6,076,740, issued June, 2000 to Townsend. However, as mentioned above, all of the known devices interrupt the operation of one or more full irrigation schedules.

Thus, there is still a need for cost effective devices and methods that automatically modify the run times of irrigation schedules of installed irrigation controllers.

SUMMARY OF THE INVENTION

The present invention provides irrigation control systems and methods that monitor control signals output by an installed irrigation controller, and selectively interrupt such signals to execute an improved irrigation schedule.

Preferred devices utilize a microprocessor to monitor the "valve(s) control" or other run signals generated by the irrigation controller, as well as to calculate and execute an improved irrigation schedule. Especially preferred devices utilize soil moisture, weather, or other extrinsic data in determining the improved irrigation schedule. Such data may be received from local and distal sources, and may advantageously include ETo or at least one of the weather factors used in calculating ETo. Preferred implementations also involve "learning" the irrigation schedule based on the signals output by the irrigation controller over several complete cycles, and more preferably over at least one week.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
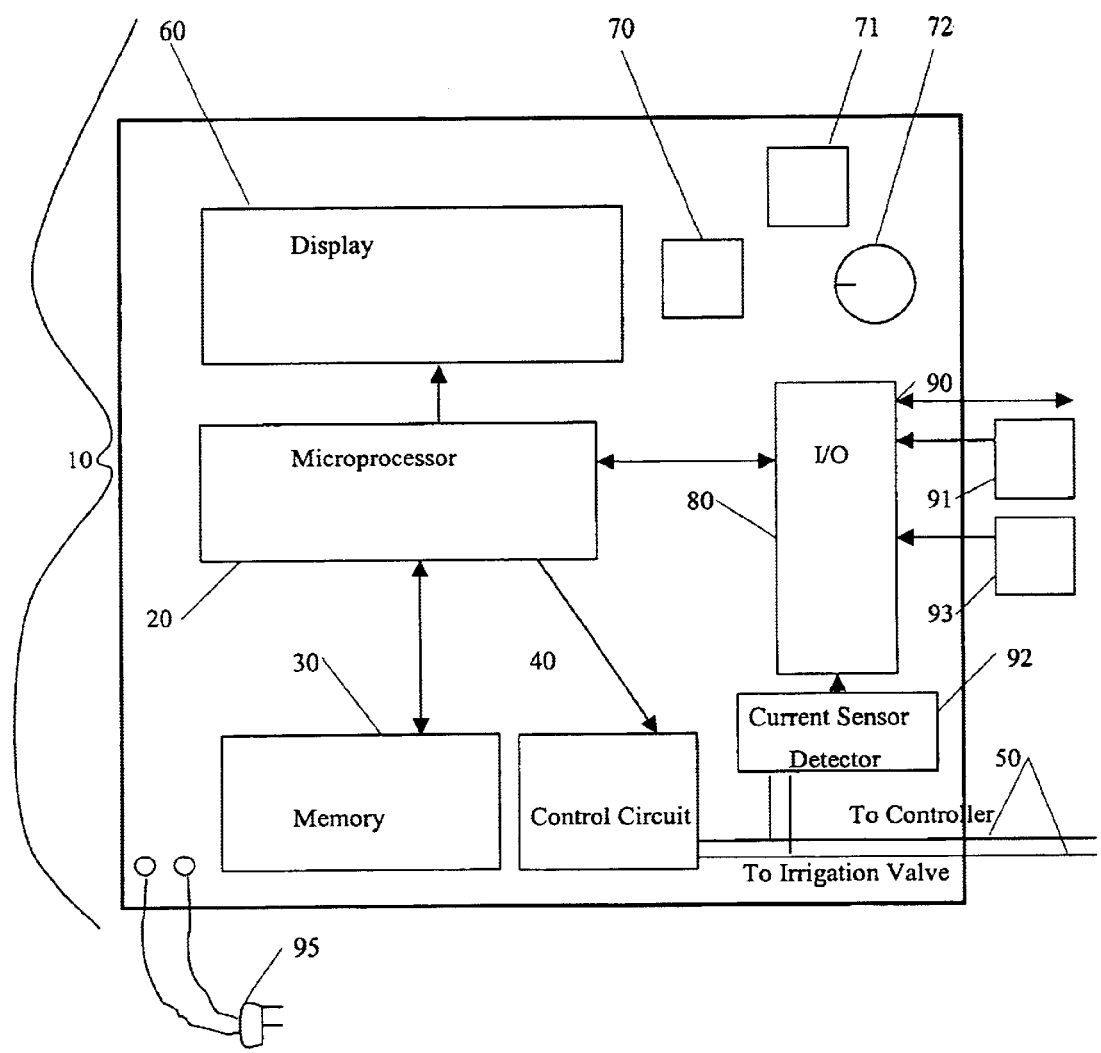
FIG. 1 is a schematic of an irrigation scheduler.

In FIG. 1 an irrigation scheduler 10 includes a microprocessor 20, an on-board memory 30, a control circuit 40, a display 60, some manual input devices 70 through 72 (knobs and/or buttons), an input/output (I/O) circuitry 80, a communications port 90, a current or other sensor detector 92, and a power supply 95. The irrigation scheduler 10 is preferably configured to receive input from a local rain sensor 91 and a local temperature sensor 93, and additional data from one or more distal sources through the communications port 90. Each of these components by itself is well known in the electronic industry, with the exception of the programming of the microprocessor in accordance with the functionality set forth herein. There are hundreds of suitable chips that can be used for this purpose. At present, experimental versions have been made using a generic Intel 80C54 chip, and it is contemplated that such a chip would be satisfactory for production models.

The control circuit 40 is preferably an electrical switching circuit. The electrical switching circuit may be of various standard types that are well known in the art and therefore are not described in detail here.

Figure 2:
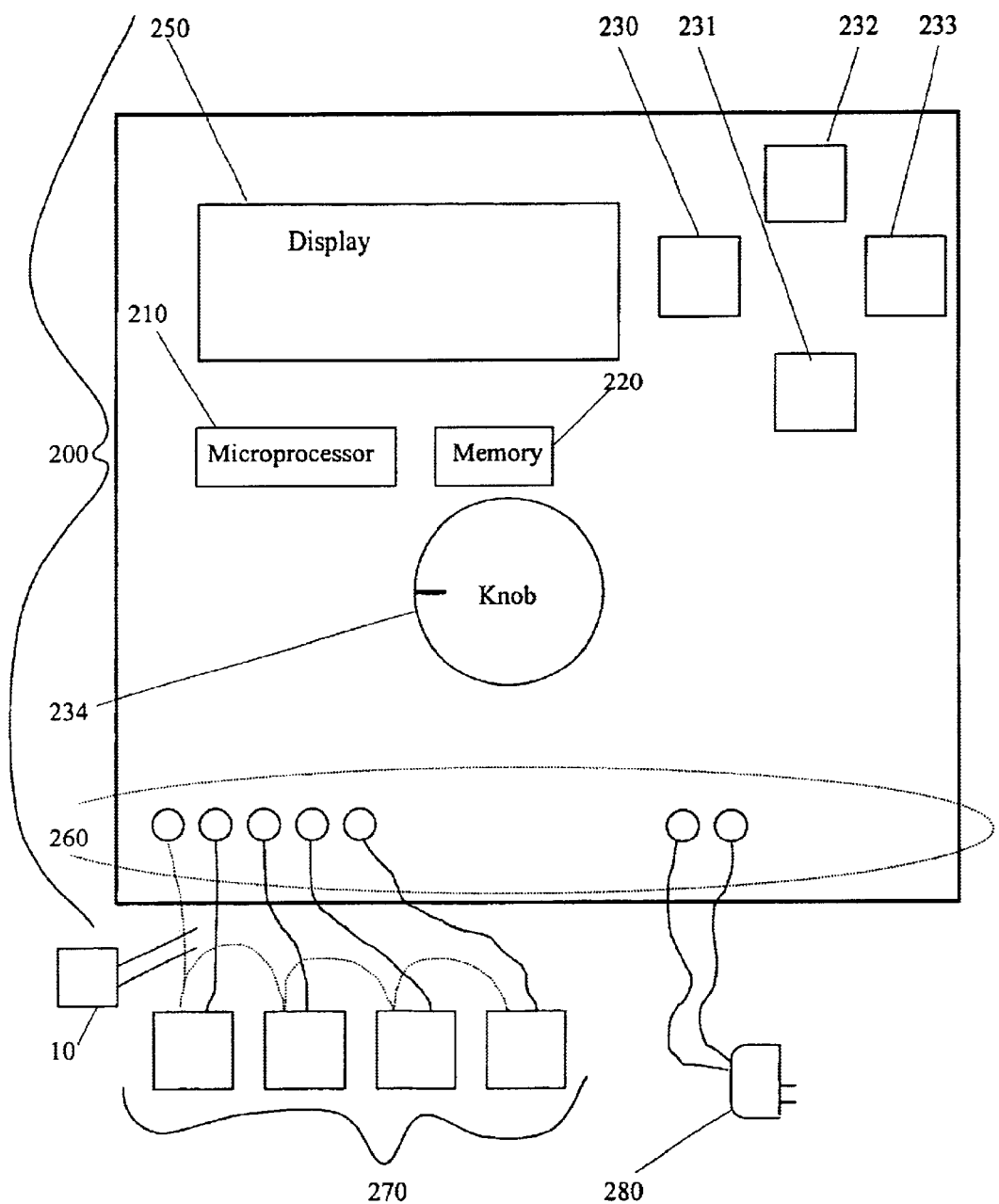
FIG. 2 is a schematic of an irrigation controller.
Figure 3:
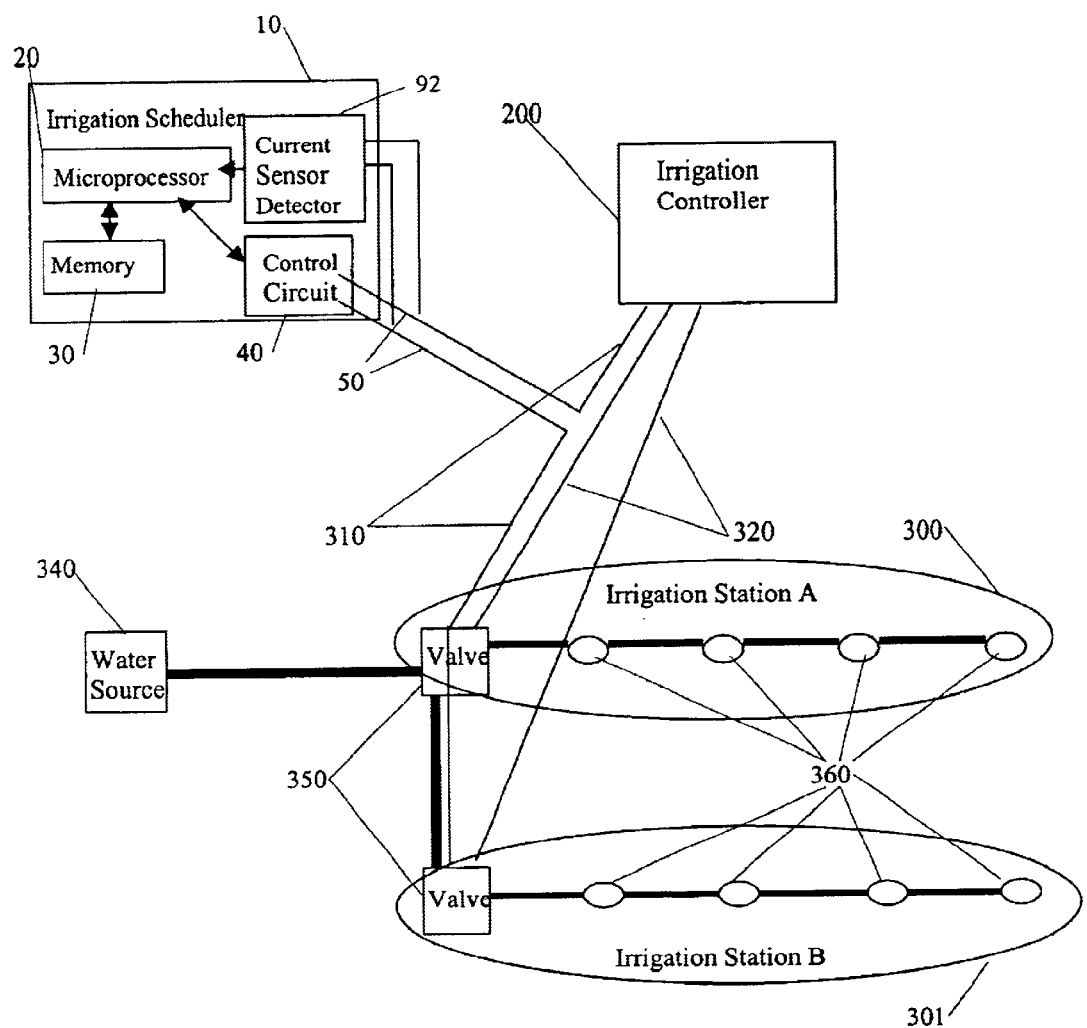
FIG. 3 is a block diagram of an automatic irrigation system coupled with an irrigation scheduler according to an aspect of the present invention.

One or more of the manual input devices 70 through 72 is preferably used to optimize or otherwise modify the run times of the first set of information. This permits the user to decrease the watering of all irrigations systems with respect to the "maximum" summer time setting, using a very simple input. One or more of the manual input devices 70 through 72 is also advantageously used to turn off the irrigation scheduler 10 to permit the irrigation controller 200, as shown in FIG. 2 and FIG. 3, to apply the preprogrammed irrigation schedule without any modification by the scheduler 10. One or more of the manual input devices 70 through 72 may also be used to set current watering at some percentage of the watering scheduled by the irrigation controller 200. Thus, there may be a button or other mechanism for setting the scheduler 10 to irrigate at 50% of that set by the controller, or some other percentage between 0% and 100%.

In FIG. 2 an irrigation controller 200 generally includes a microprocessor 210, an on-board memory 220, some manual input devices 230 through 234 (buttons and/or knobs), a display screen 250, electrical connectors 260, which are connected to a plurality of irrigation stations 270, and a power supply 280. Each of these components by itself is well known in the electronic industry.

As is well known in the art, one or more of the manual input devices 230 through 234 are used with the display screen 250 to program some sort of an irrigation schedule into the irrigation controller 200. As used herein, the term "pre-programmed irrigation schedule" is used to mean any such schedule, even though the schedule may be at least partially derived automatically by the irrigation controller 200, and even though the schedule may be manually or automatically modified over time.

Components of the irrigation controller 200 and/or the irrigation scheduler 10 may be coupled to one another using a common communication bus (not shown). The bus can use a common or custom protocol to communicate between devices. There are several suitable communication protocols, which can be used for this purpose. At present, experimental versions have been made using an I²C serial data communication, and it is contemplated that this communication method would be satisfactory for production models. This bus can be used for internal data transfer to and from an EEPROM or other memory, as well as for communication with personal computers, peripheral devices, and measurement equipment including but not limited to rain sensors, water pressure sensors, and temperature sensors. The bus can also be used by the irrigation scheduler 10 to alter or set a pre-programmed irrigation schedule in the irrigation controller 200.

In FIG. 3 the control circuit 40 disposed in the irrigation scheduler 10 provides an electrical connection 50 between the controller 200 and the irrigation valve(s) 350. From the controller 200 parallel electrical control wires 320 go to each irrigation valve(s) 350. There is also a common return wire 310 that goes from the irrigation valve(s) 350 back to the controller 200 and to the current sensor detector 92. In a preferred embodiment of the present invention, the control circuit 40 is electrically connected in series by wires 50 with the common return wire 310 from the valve(s) 350 to the controller 200. It should be appreciated that although only two stations are shown, the irrigation controller 200 would generally control more than two stations.

In operation, the irrigation controller 200 generates electrical or other output signals to actuate the opening and closing of the irrigation valve(s) 350, and such signals are detected by the current sensor detector 92. In a system using electrical signals, the starting current may be about 0.35 amps when power is first applied to a solenoid of a valve 350, and the holding current may be about 0.25 amps. These currents are transmitted through the common wire 310 to the control circuit 40 via the electrical connection 50. The current sensor detector 92 is electrically coupled to the control circuit 40, and detects the starting and holding currents. This information is passed along to the microprocessor 20, which utilizes the difference between starting and holding currents to "learn" when each valve is opened and closed. The microprocessor 20 then derives the run time of each of the irrigation stations 300–301. Such derivation can be determined by a single run cycle, but is more preferably determined over the course of at least one week to account for day schedule changes. For example, a homeowner may well schedule irrigation for Monday through Friday, but no irrigation on Saturday or Sunday to keep the grass dry for lawn mowing.

In a preferred embodiment of the present invention the irrigation controller 200 is set to execute a weekly, bi-weekly, or other irrigation schedule that would be used during the summer months. This irrigation schedule should be set to provide the highest quantity of water estimated as being required to maintain the landscape plants in a healthy condition during the driest part of the year. The microprocessor 20 disposed in the irrigation scheduler monitors the output signals from the irrigation controller 200, and thereby "learns" when the valve(s) are opened and closed, which would represent the run times for each irrigation station 300–301. This information (first set of information) is then stored in the memory. The first set of information can thus be equal to the estimated optimum run times derived by the microprocessor 20, which may advantageously be the maximum summer run times. By setting the controller 200 to a maximum run time, the scheduler 10 can operate effectively by decreasing the watering that would have otherwise been applied, and there will usually be no need to increase the watering over that which the controller 200 is already scheduled to execute. Should the settings on the irrigation controller, 200 ever be changed, either by the user or under automatic control, the microprocessor 20 will discern that the settings were changed and will learn the new run times for each irrigation station 300–301.

Microprocessor 20 optionally receives a second set of information relating to soil conditions, weather, and so forth, and preferably including at least one of the following: current ETo data, estimated ETo data, historical ETo data, temperature data, rainfall data, and water pressure data. The second set of information may also include other meteorological and environmental factors that influence the water requirements of landscape plants. The ETo value used may advantageously comprise current ETo (i.e., within the last week, three days, or most preferably within the last 24 hours), an estimated ETo value based upon a regression model using one or more of the factors used in calculating ETo (as for example that described in pending PCT patent application serial no. PCT/US00/18705 filed Jul. 7, 2000), or an historical ETo value (as for example that described in pending PCT patent application serial no. PCT/US00/40685 filed Aug. 17, 2000).

Based on both first and second sets of information, the microprocessor 20 derives run times for station 300–301 that are hopefully closer to the actual needs of the landscape plants than that included as part of the irrigation schedule executed by the irrigation controller 200. The microprocessor 20 then opens and closes the switching circuit during execution of the pre-programmed irrigation schedule by the irrigation controller 200 to effectively modify the irrigation schedule realized by the landscape plants.

The second set of information is sometimes referred to herein as "extrinsic data" because it is received from a source extrinsic to the irrigation controller 200. Extrinsic data may, for example, be received by the irrigation scheduler 10 via direct line from a soil moisture sensor (not shown), a local rain sensor 91, a local temperature sensor 93, and so forth, and/or from one or more distal sources through the communications port 90. It is particularly contemplated that extrinsic data may be received via telephone line, radio, pager, two-way pager, cable, and Internet connection. Extrinsic data may also or alternatively be received by the irrigation scheduler 10 via some sort of bus (described elsewhere herein) or other link with the irrigation controller 200.

A preferred process can be appreciated more fully by reference to the following example. Assume the second set of information is historical ETo data, and that the maximum historical ETo value is determined to be 0.32 inches per day during the year for the site where the irrigation controller 200 is located. On May 8th the historical ETo value is 0.26 inches or 81% of the maximum ETo value. Therefore, the run time for each of the stations 300–301 could advantageously be set to 81% of the run time obtained from the first set of information for each station 300–301. If the run time obtained from the first set of information for Station A 300 were 22 minutes, then Station A should only operate for about 18 minutes, or 81% of 22 minutes. The microprocessor 20 preferably accomplishes this task by closing the switching circuit 40 during 18 minutes of the 22 minute run time, and opening the switching circuit 40 during 4 minutes of the 22 minute run time. Thus, during the 4 minute "excess watering period" for Station A, none of the water valves for any of stations 300–301 would be open. When the irrigation controller 200 moves on to Station B 301, the microprocessor 20 once again limits the effective run time to about 81% of the pre-programmed run time for that Station. Thus, even though the irrigation controller 200 is sending output signals to the valves according to a pre-programmed irrigation schedule, the microprocessor 20 blocks, time-shifts, modifies, or otherwise interferes with reception of that output by the valves, thereby effectively altering the irrigation schedule "seen" by the valve(s). This allows a user having a standard, fixed-schedule irrigation controller to water his or her landscape throughout the year according to an improved irrigation schedule without replacing the irrigation controller, and without re-programming the controller.

A method according to an aspect of the inventive subject matter can thus be viewed as comprising: providing an irrigation controller programmed to execute an irrigation schedule; monitoring a plurality of control signals output by the irrigation controller; and selectively interrupting the control signal signals to execute an improved irrigation schedule. Various preferred methods may involve one or more of: detecting at least some of the plurality of control signals over a period of at least one week; monitoring comprises a microprocessor external to the irrigation controller taking part in determining run times of multiple stations being executed by the irrigation controller; calculating a water deficit and using the calculated water deficit to at least partially derive the improved irrigation schedule; and using extrinsic data to at least partially derive the improved irrigation schedule. The extrinsic data preferably comprises at least one of an ETo value and at least one of the weather factors used in calculating ETo.

An irrigation scheduler according to an aspect of the inventive subject matter can thus be viewed as comprising a microprocessor programmed to: (a) derive a first set of information from the output of an irrigation controller used to control an operation of an irrigation valve; (b) receive a second set of information comprising at least one of an environmental factor and a meteorological factor; and (c) use the first set of information and the second set of information to interfere with reception of the output by the valve. The microprocessor is preferably disposed in the irrigation scheduler, and the irrigation scheduler is not an integral part of the irrigation controller. The irrigation scheduler also preferably interferes with reception of the output by the valve indirectly, using a control circuit that is preferably a switching circuit. It is especially contemplated that the output is an electrical signal that operates a solenoid mechanically coupled to the valve. It is also contemplated that the environmental factor may advantageously comprise any of a current ETo value, an estimated ETo value, and an historical ETo value.

Thus, specific embodiments and applications of irrigation schedulers have been disclosed. It should be apparent, however, to those skilled in the art that many more modifications besides those described are possible without departing from the inventive concepts herein. The inventive subject matter, therefore, is not to be restricted except in the spirit of the appended claim.

What is claimed is:

1. A method of controlling irrigation, comprising:
   providing an irrigation controller preprogrammed to execute an irrigation schedule by sending output signals to a plurality of valves; and
   installing an irrigation scheduler that (a) monitors a a current passing over a common wire coupling the irrigation controller to each of the plurality of valves; (b) learns when the plurality of valves are open and closed by detecting starting and holding currents passing over the common wire to derive run times; and (c) selectively interferes with the output signals to adjust the irrigation schedule away from the derived run times.

2. The method of claim 1 wherein the step of monitoring comprises detecting at least some of the starting and holding currents over a period of at least one week.

3. The method of claim 1 wherein the step of monitoring comprises a micro-processor external to the irrigation controller taking part in determining run times of multiple stations being executed by the irrigation controller.

4. The method of claim 1 further comprising at least one of an evapotranspiration value and a plurality of weather factors used in calculating evapotranspiration to at least partially derive the improved irrigation schedule.

5. The method of claim 1 wherein the step of monitoring comprises a microprocessor external to the irrigation controller taking part in determining run times of multiple stations being executed by the irrigation controller over a period of at least one week, and further comprising the microprocessor using at least one of an evapotranspiration value and a weather factor used in calculating evapotranspiration to at least partially derive the improved irrigation schedule.

6. An irrigation scheduler that cooperates with an existing irrigation controller having an electrical circuit that electrically couples the irrigation controller and an irrigation valve, comprising:
- a microprocessor programmed to derive a first set of information from an output comprising at least one of starting and holding currents produced by the irrigation controller,
- the microprocessor further programmed to receive a second set of irrigation comprising at least one of an evapotranspiration value and a weather factor used in calculating evapotranspiration; and
- the microprocessor further programmed to use the first set of information and the second set of information to cause an interruption of the circuit.

7. The irrigation scheduler of claim 6, wherein the microprocessor is disposed in the irrigation scheduler, and the irrigation scheduler is not an integral part of the irrigation controller.

8. The irrigation scheduler of claim 6, further comprising a switching circuit used by the microprocessor to implement the interruption.

9. The irrigation scheduler of claim 6, wherein the irrigation scheduler produces an electrical signal output that operates a solenoid mechanically coupled to the valve.

10. The irrigation scheduler of claim 6, wherein the microprocessor is programmed to derive a sequence and duration of operation of the irrigation valve from the output.

11. The irrigation scheduler of claim 6, wherein the evapotranspiration value comprises a current evapotranspiration value.

12. The irrigation scheduler of claim 6, wherein the evapotranspiration value comprises an estimated evapotranspiration value.

13. The irrigation scheduler of claim 6, wherein the evapotranspiration value comprises an historical evapotranspiration value.

* * * * *